United States Patent

[11] 3,594,608

| | | |
|---|---|---|
| [72] | Inventor | Jon C. Mutton<br>Tigard, Oreg. |
| [21] | Appl. No. | 823,898 |
| [22] | Filed | May 12, 1969 |
| [45] | Patented | July 20, 1971 |
| [73] | Assignee | Tektronix, Inc.<br>Beaverton, Oreg. |

[54] ELECTRON BEAM DISPLAY SYSTEM HAVING LIGHT DETECTOR PEN WITH ASSOCIATED SAMPLING AND MEMORY CIRCUITS
14 Claims, 2 Drawing Figs.

[52] U.S. Cl. .................................................. 315/24,
340/324 A
[51] Int. Cl. ..................................................... H01j 29/74
[50] Field of Search ........................................... 315/18;
340/324.1

[56] References Cited
UNITED STATES PATENTS
| 3,189,889 | 6/1965 | Bridgett.......................... | 340/324.1 |
| 3,256,516 | 6/1966 | Melina et al................... | 340/324.1 |

Primary Examiner—Rodney D. Bennett, Jr.
Assistant Examiner—Brian L. Ribando
Attorney—Buckhorn, Blore, Klarquist & Sparkman ABSTRACT: A cathode-ray tube display system is described in which a light pen is employed to indicate the position of and to write on a selected portion of a display on a television monitor by detecting the light trace of the electron beam as it is deflected by the raster signal past such pen at the selected display portion. The system employs a sampling gate and an analog memory circuit for sampling horizontal and vertical ramp signals synchronized with the raster signal when a trigger signal is produced by the light detector, and for storing horizontal and vertical sample voltage levels corresponding to the position of the light pen. These sample voltages are employed to write a light pen spot on the display during the retrace time of the horizontal raster signal, either by generating a cursor signal which is applied directly to the TV monitor or by applying such sample voltages to the deflection circuits of a scan conversion storage tube. Charge images of the display and the pen spot are written on the storage tube and stored so that during reading such tube supplies an electrical readout signal corresponding to such charge images to the TV monitor.

JON C. MUTTON
INVENTOR

BY
BUCKHORN, BLORE, KLARQUIST & SPARKMAN
ATTORNEYS

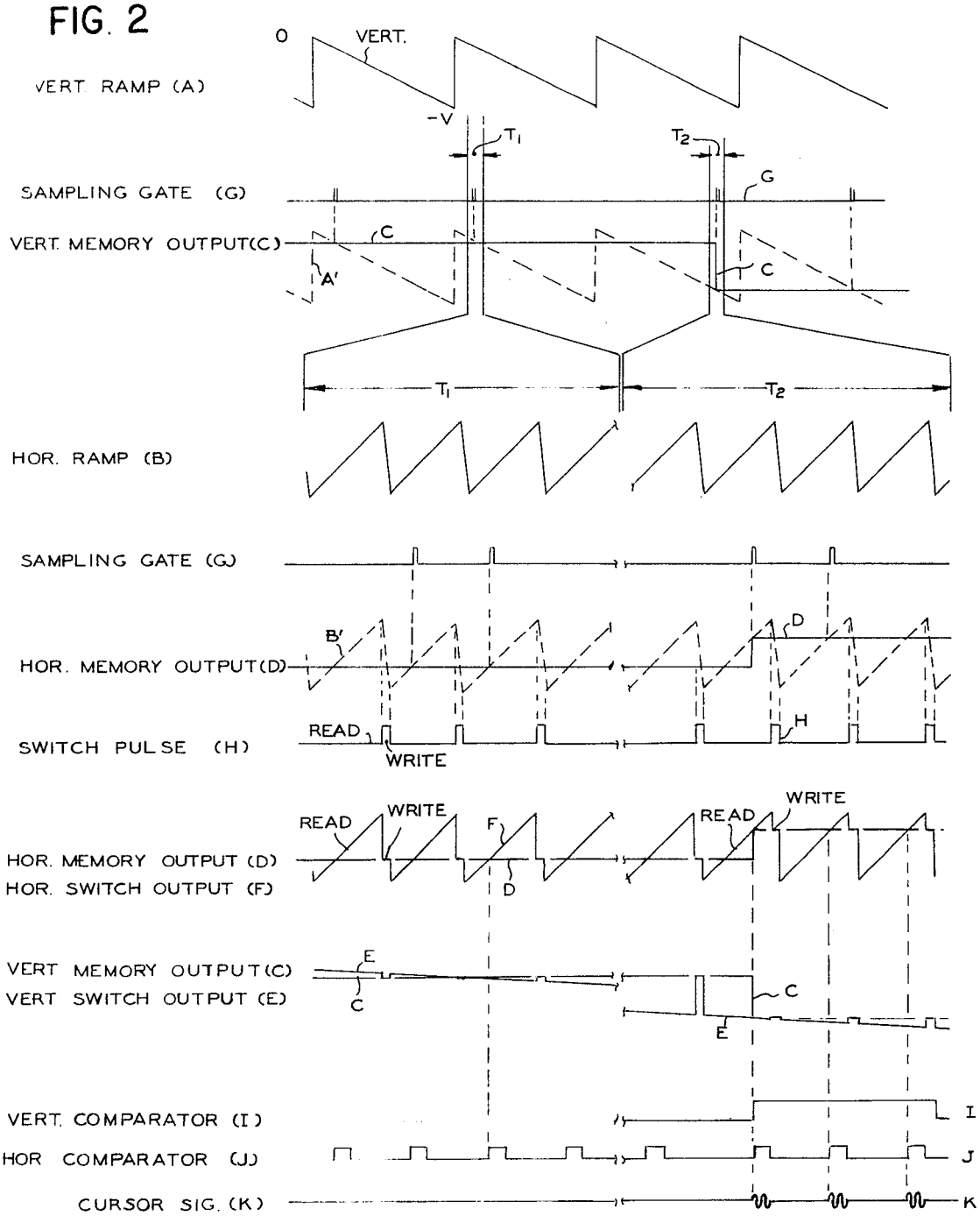

ELECTRON BEAM DISPLAY SYSTEM HAVING LIGHT DETECTOR PEN WITH ASSOCIATED SAMPLING AND MEMORY CIRCUITS

BACKGROUND OF THE INVENTION

The subject matter of the present invention relates generally to electron beam display systems, and in particular to such systems in which a light detector pen is employed to indicate the position of and to write on a selected portion of the display presented on a TV monitor by detecting the light trace on the fluorescent screen of the raster signal of such monitor. The output trigger pulse of the light detector coupled to such pen, triggers a a sampling pulse generator which operates a pair of sampling gates that sample portions of horizontal and vertical ramp voltages, synchronized to the horizontal and vertical raster signals, which are applied to the inputs of such gates. The outputs of the sampling gates are fed to analog memory circuits which produce DC output sample voltages corresponding to the amplitudes of the vertical and horizontal sample signals. These horizontal and vertical sample voltages correspond to the horizontal and vertical position of the light pen. The sample voltage outputs of the horizontal and vertical memory circuits may be fed directly to a utilization device such as an analog-to-digital converter or other TV monitors. In addition, these sample voltages are applied to a scan converter storage tube when such a storage tube is employed to store a charge image of the display and to provide a corresponding electrical readout signal to the TV monitor on which such display is presented. The horizontal and vertical deflection systems of the storage tube are connected through switches to the outputs of the memory circuits in one switch position, and to the outputs of the ramp generator in the other switch position, for writing and reading, respectively. This enables the light pen spot charge image to be written and stored on the storage tube so that during reading a corresponding portion of the readout signal is transmitted to the TV monitor and produces a pen spot on the display at the position of the light pen. A cursor generator connected to the outputs of the sample memories can also be employed to write the pen light spot on the monitor without using such storage tube.

Light pen systems have been previously employed by computer operators to "talk" to the computer by applying input information directly to the computer through the TV monitor. A scan conversion storage tube has been employed to store the display presented on the TV monitor while changes are being made in such display with the light pen, thereby freeing the computer for other uses, as described in the article, "A Computer Time Shared display," by S. B. Gray in the publication "Information Display," Jan./Feb. 1966, page 50. However, such previous display system does not employ a ramp generator sampling circuit and memory circuit in accordance with the present invention. In addition, unlike the present system, light pen writing on the storage tube does not take place during the horizontal ramp retrace, but instead occurs shortly after triggering of the light pen detector.

It is therefore one object of the present invention to provide an improved electron beam display system employing a light detector pen means for determining the relative position of a selected portion of a display presented on a cathode ray tube by sensing the light trace of its electron beam as such beam is deflected by horizontal and vertical raster signals and by producing X- and Y-voltages corresponding to such position and applying such voltages to a utilization device.

Another object of the invention is to provide such a display system whose frequency response is not limited by the response of the utilization device, in which sampling gates and analog memory circuits are employed to sample horizontal and vertical ramp signals corresponding to the raster signals when the light detector produces a trigger pulse, and to store DC sample voltages corresponding to the amplitudes of such sample signals, so that such sample voltages indicate the horizontal and vertical position of the light pen.

A further object of the present invention is to provide such display system in which information corresponding to the light pen position is written on the cathode ray tube only during the retrace time of the horizontal raster signal to provide a more efficient operation.

An additional object of the invention is to provide such a display system in which a scan conversion storage tube is employed to store a charge image of the display and of the light pen position spot and to readout a corresponding signal to the cathode-ray tube to enable the computer or other display signal source to be disconnected from the system once the original display is written on to the storage tube, thereby freeing such computer for other uses.

Still another object of the invention is to provide such a display system with a cursor generator including comparators controlled by the outputs of the memory circuits and the ramp generator and gating an oscillator having its output connected directly to the intensity modulation axis of the television monitor to provide a cursor display of the light pen spot without storing such spot on the scan conversion storage tube.

BRIEF DESCRIPTION OF DRAWINGS

Other objects and advantages of the present invention will be apparent from the following description of a preferred embodiment thereof and from the attached drawings of which:

FIG. 2 is a diagram of the electrical signal waveforms produced within the display system of FIG. 1.

DESCRIPTION OF PREFERRED EMBODIMENT

Figure 1:
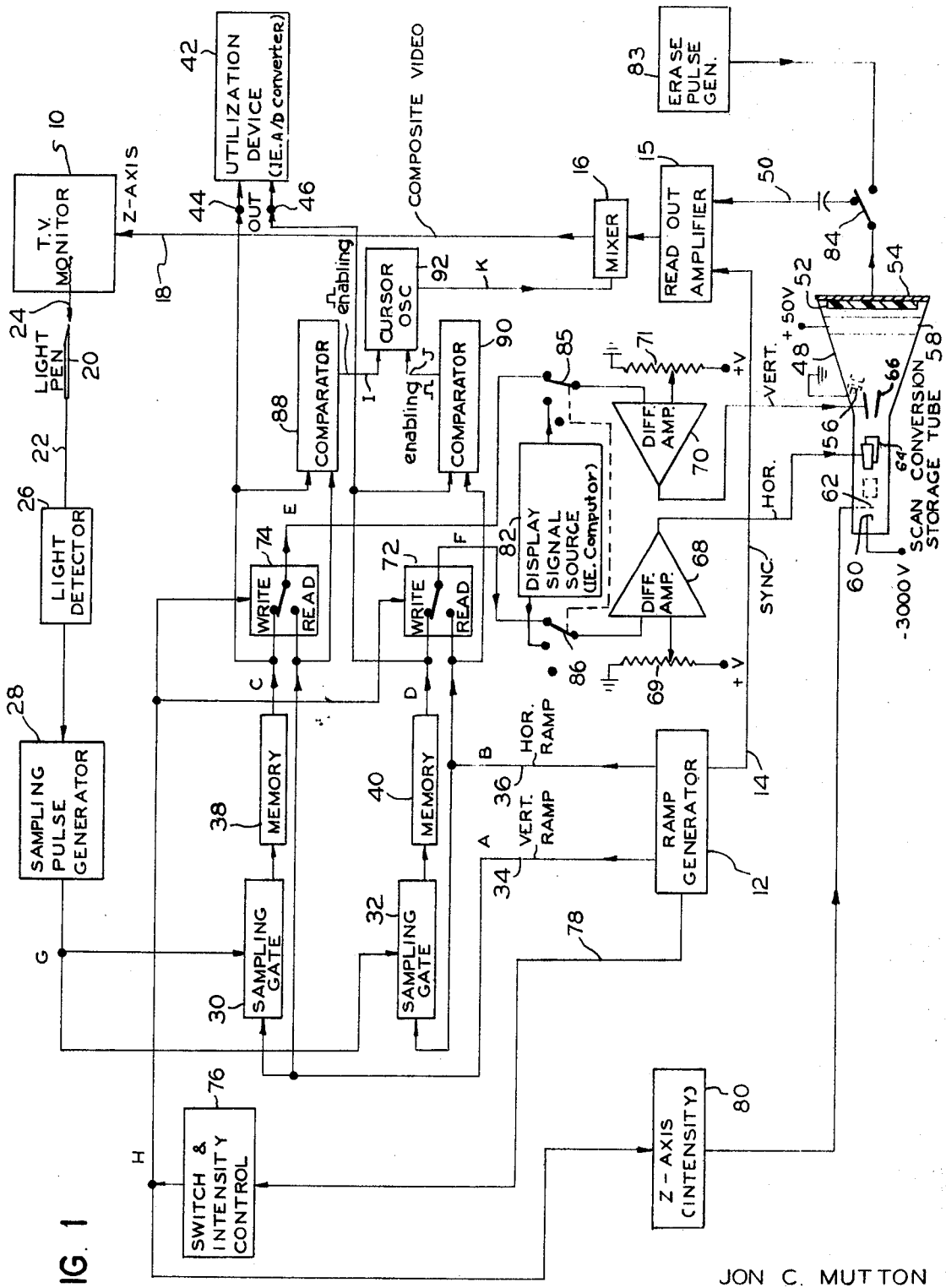
FIG. 1 is a schematic diagram of the electrical circuit of one embodiment of the display system of the present invention.

As shown in FIG. 1, the electron beam display system of the present invention includes a TV monitor 10 of conventional type containing a cathode-ray tube and the usual raster signal generator which applies a vertical ramp raster signal having a frequency of about 60 Hertz to the vertical deflection circuit and a horizontal ramp raster signal having a frequency of, for example, 15,750 Hertz to the horizontal deflection circuit of such tube. These raster signals are synchronized to corresponding ramp signals produced by a ramp signal generator 12 by means of a sync signal output 14 connected between such generator and the input of a readout amplifier 15 whose output is transmitted through a mixer circuit 16 to the Z-axis input 18 of monitor 10 to provide such synchronization. A movable light pen 20 which may be in the form of a flexible light guide 22 provided by a bundle of fiber optic elements is positioned adjacent the fluorescent screen of monitor 10, so that light 24 from a trace on such screen enters the input ends of the light guide elements. Such input ends are contained within a pen-housing member of opaque material having an aperture in one end of such housing to admit the light 24 and limit the viewing field of such pen to a few television line widths.

A photoelectric light detector 26, which may be in the form of a photomultiplier tube positioned externally of the pen 20, is coupled to the light guide 22 and produces an electrical output pulse whenever a light pulse is received by the light pen as the electron beam trace passes through its viewing field.

The output of the light detector 26 is applied as a trigger pulse to a sampling pulse generator 28, which may be a monostable multivibrator that generates narrow rectangular sampling pulses G of substantially uniform width and amplitude. The output of the sampling pulse generator 28 is connected to a vertical sampling gate 30 and a horizontal sampling gate 32, having their inputs connected, respectively, to the vertical ramp output 34 and the horizontal ramp output 36 of ram generator 12. The sampling gates 30 and 32 are biased nonconducting and are rendered conducting by the sampling pulse. A pair of analog memory circuits 38 and 40 are connected, respectively, to the outputs of the sampling gates 30 and 32. The sampling gates and memories are conventional circuits such as a diode bridge sampling gate and a Miller integrator memory, where extremely fast response and high accuracy are desired. However, it is also possible to provide the sampling gates in the form of field effect transistors normally biased nonconducting and operated as switches, while the memory circuit may include a shunt capacitor having one terminal grounded and its other terminal connected to the input of a field effect transistor providing a high-impedance, low-leakage input and enabling a continuous readout of such memory. Any suitable utilization device 42 may be connected through system output terminals 44 and 46 to the sample memory circuits 38 and 40, respectively. For example, the utilization device 42 may be an analog-to-digital converter or other "slave" X-Y monitor, and such converter may be part of a computer which produces the display presented on the monitor 10, as hereafter described.

When the sampling gates 30 and 32 are rendered conductive by the sampling pulses, they transmit sample portions of the vertical ramp signal A and the horizontal ramp signal B to the memories 38 and 40. As a result a vertical sample voltage C and a horizontal sample voltage D are produced at the outputs of the memories 38 and 40 whose DC voltage levels correspond to the amplitudes of the vertical ramp sample portion and the horizontal ramp sample portion, respectively, transmitted through the sampling gates. These sample voltages indicate the horizontal and vertical coordinates or addresses of the position of the light pen at the time it produces the sampling pulse, and may be used to properly locate the light pen spot on the display presented on monitor 10.

A scan conversion storage tube 48 is employed to store the display image and transmit a corresponding electrical readout signal to the Z-axis input 18 of the TV monitor 10 through a readout conductor 50 connected between the storage tube and the input of the readout amplifier 15. The storage tube 48 may be a halftone-type storage tube or a bistable storage tube. One suitable bistable storage tube is shown in U.S. Pat. No. 3,293,473 of R. H. Anderson, granted Dec. 20, 1966, in which the storage dielectric is made of a thin, porous layer of phosphor material 52 supported on a light transparent conductive film 54 of tin oxide which forms the collector electrode for the secondary electrons emitted from such storage dielectric. This tube is a simplified direct viewing bistable storage tube which produces a light image corresponding to the charge image stored on the storage target because low-velocity "flood" electrons uniformly bombard the storage dielectric. The flood electrons are emitted by a flood gun 56, whose cathode may be grounded when the collector electrode 54 has a potential of about +150 to +200 volts to enable bistable storage as described in such patent. The storage tube may also include a plurality of collimating electrodes 58, only one of which is shown, coated on the inner surface of the tube envelope and connected to a potential of about +50 . The collimating electrodes collimate the flood electrons and cause them to bombard the storage dielectric 52 perpendicularly as well as uniformly distributing such electrons over such dielectric. A main electron gun including a cathode 60 connected to a negative DC supply voltage of about —3,000 volts, and a control grid 62 is provided in the storage tube to produce a high-velocity electron beam which may be used as both a writing beam and a reading beam. Thus the writing beam is of a sufficient current density so that it writes a charge image on the storage dielectric 52 of sufficient voltage to store, while the reading beam is of such current density to enable it to scan the stored charge image and produce a corresponding readout signal on collector 54 without destroying such charge image. These read and write operations are controlled by a pair of horizontal deflection plates 64 and a pair of vertical deflection plates 66 provided within the storage tube and connected to the outputs of a horizontal amplifier 68 and a vertical amplifier 70, respectively. The amplifiers 68 and 70 are differential amplifiers each having one input connected to the movable contact of a potentiometer 69 and 71, respectively, extending between a suitable DC supply voltage and ground. The other inputs of the differential amplifiers 68 and 70 are connected to the outputs of switch circuit 72 and 74, respectively, which apply read and write signals to the storage tube.

The vertical switch circuit 74 has a pair of inputs, one being connected to the output of the memory 38 and the other being connected to the vertical ramp output 34 of ramp generator 12. The horizontal switch circuit 72 has a pair of inputs, one being connected to the output of memory 40 and the other being connected to the horizontal ramp output 36 of the ramp generator. The operation of switch circuits 72 and 74 is controlled by a switching pulse H transmitted from a switch and intensity control circuit 76.

The writing operation of the storage tube circuit is hereafter described. A horizontal drive output 78 of the ramp generator 12 is connected to the control circuit 76 to cause such control circuit to produce the switching pulse H during the retrace time of the horizontal ramp B. Thus the switching pulse actuates switches 72 and 74 into the "write" position shown, whereby the amplifiers 68 and 70 are connected to the memory circuits 40 and 38. At the same time the switching pulse switches an intensity circuit connected to the control grid 62 in the storage tube to increase the current density of the electron beam to its writing level. The switches 72 and 74 apply the horizontal and vertical sample voltages to the deflection plates of the storage tube, thereby positioning its electron beam at a point on the storage dielectric 52 corresponding to the light pen position on the TV monitor 10, and causing a charge image to be formed on such dielectric of the light pen spot and stored bistably. Thus charge image of the light pen spot is written on the storage tube during the horizontal retrace of the ramp generator 12 and the raster generator in the television monitor. This method of writing during retrace is disclosed in copending U.S. Pat. application, Ser. No. 781,764 of P.T. Unger, filed Dec. 6, 1968 and assigned to the assignee of the present application.

The read operation of the storage tube circuit is as follows. Switches 72 and 74 change back to the "read" position when the switch pulse H terminates so that the output of such switches is then connected directly to the horizontal ramp output 36 and the vertical ramp output 34, respectively, of the ramp generator. At the same time the intensity circuit 80 reduces the current density of the electron beam back to the reading level. As a result, the horizontal ramp B and vertical ramp A are applied, respectively, to the horizontal and vertical deflection plates of the storage tube to uniformly scan the electron beam across the storage dielectric and produce an electrical readout signal on collector 54 corresponding to the stored charge image. The readout signal is transmitted through the readout conductor 50 to the Z-axis input 18 of the TV monitor 10 and produces a display image on such monitor corresponding to such charge image. In this manner complete displays may be formed by moving the light pen over the fluorescent screen of the monitor 10, or such light pen can be used as an indicator to point to or write on selected portions of another display previously written on the storage tube by a display signal source 82. When erasure of the entire storage target is desired, an erase pulse generator 83 connected to the collector electrode 54 of the storage tube is energized as shown schematically by a switch 84 to enable the flood electrons to uniformly charge the target to the collector voltage and return the target to a ready-to-write potential near the flood gun cathode voltage.

The display signal source 82, such as a TV camera or computer, is connected through switches 85 and 86, respectively, to the inputs of the vertical amplifier 70 and the horizontal amplifier 68, to apply input signals to the deflection plates of the storage tube causing the primary display to be written on the storage tube. Such primary display can be a graph, map, or other diagrams, or it may be in the form of alphanumeric information produced by a computer.

A cursor operation is also possible to provide a light pen spot on the monitor 10 without storing the charge image of the light pen spot. At this time the switches 85 and 86 disconnect the amplifiers 70 and 68 from the memories 38 and 40. A vertical comparator 88 having a pair of inputs is connected at one input to the output of the memory 38 and is connected at its other input to the vertical ramp output 34 of the ramp generator. The comparator produces a first enabling pulse output *I* when the vertical ramp *A* equals the vertical memory voltage *C*. The width of the first enabling pulse is determined by the time constant of a monostable multivibrator in the comparator circuit. In a similar manner, a horizontal comparator circuit 90 is connected at one input to the output of memory 40 and is connected at the other input to the horizontal ramp output 36 of the ramp generator. Thus the horizontal comparator 90 produces a second enabling pulse *J* when the horizontal ramp *B* equals the horizontal memory voltage *D*. The two enabling pulses produced at the output of comparators 88 and 90 are fed to the input of a cursor oscillator 92, which may be a blocking oscillator that is gated "on" to produce cursor signals *K* only upon coincidence of both the enabling signals. The cursor oscillator has a high free-running frequency on the order of about 5 MegaHertz, so that it produces several sine wave cursor output signals for each horizontal comparator pulse. These cursor signals are transmitted through the mixer circuit 16 to the Z-axis input 18 of the monitor 10, and cause a light pen spot to appear on the monitor display at the last position of the light pen when it actuated the sampling pulse generator 28.

The signal waveforms produced by the circuits in the display system of FIG. 1 are shown in FIG. 2. Each of these signals is identified by a letter at the position in the system of FIG. 1 where such signal occurs. Therefore further description of these waveforms is believed to be unnecessary. However, it should be noted that the vertical ramp signal *A*, the sampling gate pulses *G* and the vertical memory voltage *C*, shown as the upper three signal waveforms of FIG. 2, are of a different time scale than that of the remaining signal waveforms. Thus the other signal waveforms are shown on an expanded time scale with time periods $T_1$ and $T_2$ corresponding to similarly designated portions of the upper three signal waveforms.

It should be noted that there is some time delay between the actuation of the light detector 26 and operation of the sampling gates 30 and 32 and associated memory circuits 38 and 40 so that the memory voltages *C* and *D* do not exactly correspond to the X- and Y-cooridinates of the light pen position. The DC offset voltages applied by potentiometers 69 and 71 to the differential amplifiers 68 and 70 compensate for this time delay by subtracting the proper amount from the memory voltages.

It will be obvious to those having ordinary skill in the art that many changes may be made in the above described details of the preferred embodiment of the present invention without departing from the spirit of the invention. Therefore the scope of the invention should only be determined by the following claims.

I claim:

1. An electron beam display system, comprising:

display means including a cathode ray tube having an electron beam deflection means, scanning means for applying a horizontal raster signal and a vertical raster signal having ramp-shaped waveforms to the deflection means for beam the electron beam in said tube horizontally and vertically so that said beam is scanned across its fluorescent screen in a standard raster pattern, and input means for modulating said beam in accordance with an input signal applied to said input means to form a light image display on said screen;

ramp generator means for generating a horizontal ramp signal and a vertical ramp signal corresponding to the horizontal and vertical raster signals;

light detection means including a movable light pickup device, for generating an electrical trigger pulse as the electron beam scans the fluorescent screen at a selected portion of the display within the viewing field of said light pickup device;

sampling circuit means connected to the output of the ramp generator for sampling a portion of each of the horizontal and vertical ramp signals when a sampling gate pulse corresponding to said trigger pulse is applied thereto, and for transmitting horizontal and vertical sample signals to the outputs of said sampling means, said horizontal and vertical sample signals having amplitudes corresponding, respectively, to the horizontal position and the vertical position of said selected portion of the display; and memory circuit means connected to the outputs of said sampling means for storing the horizontal and vertical sample signals as DC sample voltages and for transmitting such horizontal and vertical sample voltages to the output terminals of the system until subsequent sample signals are applied thereto, said scanning means for the cathode ray tube being independent of the memory circuit means so that its sample voltage outputs have no effect on said raster signals applied to the deflection means of said tube.

2. The system of claim 1 in which the memory circuit means provides a continuous readout of the horizontal and vertical sample voltages to a utilization device connected to said output terminals.

3. The system of claim 1 which includes writing means connected to the outputs of said memory means, for writing additional information on the screen of said cathode ray tube at a position corresponding to the position of said light pickup, during the retrace time of the horizontal ramp and raster signals, said raster signals being separate from said ramp signals but synchronized thereto.

4. The system of claim 1 in which the sampling circuit means in an analog signal sampling circuit including a sampling gate and a sampling pulse generator which generates sampling gate pulses of substantially uniform width and applies such gate pulses to the sampling gate in response to the receipt of said trigger pulses.

5. The system of claim 1 in which the light detection means includes a photoelectric device mounted externally of the movable light pickup device and said pickup device includes a flexible light guide means for optically coupling said photoelectric device to said fluorescent screen.

6. The system of claim 5 in which the light guide means includes a plurality of fiber optic elements held at one end within a movable light pen member.

7. The system of claim 1 which also includes cursor signal generator means connected to the outputs of the memory means, for generating a cursor signal corresponding to the position of the selected portion of the display and for applying said cursor signal to the input means of said display means to produce a cursor image on said display at said selected portion.

8. The system of claim 1 which also includes a scan conversion storage tube, writing means for forming a charge image of the display on a storage target in such tube and storing said charge image, and reading means for producing an electrical readout signal corresponding to said stored charge image and for applying said readout signal to the input means of said display means to form the display image.

9. The system of claim 8 in which the reading means connects the deflection means of the storage tube to the outputs of the ramp generator means to deflect the electron beam within such storage tube in accordance with the horizontal and vertical ramp signals to produce the readout signal.

10. The system of claim 9 in which the writing means selectively connects the deflection means of the storage tube to the horizontal and vertical sample voltage outputs of the memory means to move its electron beam to a position in the stored charge image on the storage target corresponding to the position of the selected portion of the display on the monitor tube, and to write a second charge image corresponding to the movement of said light pickup device.

11. The system of claim 10 in which the writing means causes the second charge image to be stored so that a readout signal corresponding thereto is transmitted to the display means by the reading means.

12. The system of claim 8 in which the storage tube contains means for bombarding the storage target with low-velocity electrons to cause bistable storage of the charge image.

13. The system of claim 12 in which a storage dielectric of phosphor material is used for the storage target on which a charge image is formed to provide a direct-viewing bistable storage tube.

14. The system of claim 1 in which the memory circuit means is an analog signal memory.